United States Patent

Baerd

[11] Patent Number: 5,923,136
[45] Date of Patent: Jul. 13, 1999

[54] SYSTEM FOR POWERING AUXILIARY EQUIPMENT IN A REMOTELY-POWERED PUMPING STATION

[75] Inventor: Henri Baerd, Champagne sur Seine, France

[73] Assignee: Cegelec, Levallois Perret, France

[21] Appl. No.: 08/836,912

[22] PCT Filed: Nov. 23, 1995

[86] PCT No.: PCT/FR95/01549

§ 371 Date: Aug. 6, 1997

§ 102(e) Date: Aug. 6, 1997

[87] PCT Pub. No.: WO96/16461

PCT Pub. Date: May 30, 1996

[30] Foreign Application Priority Data

Nov. 24, 1994 [FR] France .................................. 94 14099

[51] Int. Cl.[6] .............................. H02K 13/00; H02P 3/00
[52] U.S. Cl. ...................... 318/434; 318/439; 318/254; 318/447
[58] Field of Search .................................. 318/430–480; 361/20–32; 392/301, 305; 166/60

[56] References Cited

U.S. PATENT DOCUMENTS

| | | | |
|---|---|---|---|
| 3,696,288 | 10/1972 | Carman | 323/21 |
| 3,855,515 | 12/1974 | Hutchins, Jr. | 318/685 |
| 3,976,919 | 8/1976 | Vandevier et al. | 317/47 |
| 3,994,419 | 11/1976 | Sasnett, Jr. et al. | 222/26 |
| 4,000,446 | 12/1976 | Vandevier et al. | 317/36 TD |
| 4,021,700 | 5/1977 | Ellis-Anwyl | 361/28 |
| 4,178,579 | 12/1979 | McGibbeny et al. | 340/856 |
| 4,273,513 | 6/1981 | Salina | 417/12 |
| 4,442,395 | 4/1984 | Salina et al. | 320/48 |
| 5,012,868 | 5/1991 | Bridges | 166/248 |
| 5,099,918 | 3/1992 | Bridges et al. | 166/60 |
| 5,193,985 | 3/1993 | Escue et al. | 417/53 |
| 5,198,734 | 3/1993 | Johnson | 318/369 |
| 5,621,776 | 4/1997 | Gaubatz | 376/242 |
| 5,621,844 | 4/1997 | Bridges | 392/301 |
| 5,708,337 | 1/1998 | Breit et al. | 318/439 |

FOREIGN PATENT DOCUMENTS

| | | |
|---|---|---|
| 2230141 | 12/1974 | France . |
| 2506959 | 12/1982 | France . |
| 2542522A1 | 9/1984 | France . |
| 2699016A1 | 6/1994 | France . |
| 2425686A1 | 12/1975 | Germany . |
| 2190551 | 11/1987 | United Kingdom . |

*Primary Examiner*—Paul Ip
*Attorney, Agent, or Firm*—Sughrue, Mion, Zinn, Macpeak & Seas, PLLC

[57] ABSTRACT

A transformer has its primary windings connected in series with the pumping motor and has secondary windings powering in cascade a rectifier and a voltage limiter regulating the voltage supplied to the auxiliary equipment by diverting excess current supplied by said secondary windings.

11 Claims, 3 Drawing Sheets

SYSTEM FOR POWERING AUXILIARY EQUIPMENT IN A REMOTELY-POWERED PUMPING STATION

FIELD OF THE INVENTION

The present invention relates to a power supply system for auxiliary equipment in a remotely-powered pumping station.

BACKGROUND OF THE INVENTION

When operating underwater oil wells, that it is desirable to fit each well with a pumping station. The station must be an underwater pumping station. It is desirable to supply power to the pumping station from a remote location, possibly from the shore. That requires powering the pumping station by means of a power cable, running from a power supply generator. Since the motor of the pump is an induction motor, it is powered directly by a power supply generator delivering three-phase AC thereto at variable frequency via a cable system essentially comprising a three-conductor power cable. By way of numerical example, the motor and pump unit may consume up to 2500 kW, i.e. 3500 kVA, or about 300 A at 6.6 kV at a frequency of 100 Hz. Nevertheless, applications are already being envisioned at 6000 kW.

A voltage-raising transformer and a voltage-lowering transformer may be inserted at respective ends of the cable to reduce losses.

In the pumping station, adjacent to the motor and pump unit, various items of auxiliary equipment are provided including electronics cards that operate on DC and at low power, and valves, fans, or pumps, operating on AC at medium power.

This means that such auxiliary equipment needs to be supplied power and that control and information signals need to be interchanged therewith.

The conventional solution is either to add a cable for this purpose adjacent to the power cable, or to incorporate additional conductors in the power cable.

Documents FR-A-2 699 016, FR-A-2 506 969, and FR-A-2 230 141 also disclose, in various technical fields, that it is possible to avoid using additional electrical conductors for powering auxiliary equipment associated with a load that is powered with AC. The solution suggested in those documents is to supply power to the auxiliary equipment by means of a current transformer having its primary winding in series with the load. Document FR-A-2 699 016 suggests in particular providing such a current transformer for each phase. All three documents mentioned indicate that the current in the secondary winding must be rectified and regulated in order to obtain satisfactory DC power supply for the auxiliary equipment. In particular, documents FR-A-2 699 016 and FR-A-2 230 141 suggests providing in cascade a rectifier and a voltage limiter that diverts the excess current supplied by the secondary winding.

Nevertheless, it is not practical to apply this technique to the case of a remotely-powered pumping station because of the above-mentioned electrical characteristics of pumping stations. The amount of excess current can be very great, and conventional limiting means, as indeed the techniques of documents FR-A-2 699 016 and FR-A-2 230 141 lead to excessive amounts of power being dissipated.

SUMMARY OF THE INVENTION

The present invention provides a solution to the above described problem.

According to a preferred embodiment of the invention, the power supply system for a remotely powered pumping station comprises a transformer having one primary winding per phase connected in series with the pumping motor, and having one secondary winding per phase feeding in cascade a rectifier and a voltage limiter that diverts excess current delivered by said secondary winding and a capacitor connected in parallel with the DC output of said rectifier, with the charged voltage thereof being compared with a reference voltage to control a voltage-limiting switch diverting the excess direct current supplied by said rectifier to a short circuit.

As a result, current is diverted via a temporary short circuit; power dissipation is thus minimal.

According to another characteristic of the invention, said auxiliary equipment is DC equipment connected to the output of said rectifier in parallel with said voltage limiter. Thus, the voltage limiter also regulates the DC voltage which is supplied to the DC auxiliary equipment.

According to another characteristic of the invention, a decoupling diode is provided between said voltage-limiting switch and said capacitor, in order to preserve the charge on said capacitor.

According to another characteristic of the invention, said auxiliary equipment is AC equipment connected to the phases of said secondary winding in parallel with said rectifier. The voltage limiter circuit regulates the amplitude of this voltage, dissipating any excess current in its resistive load.

According to another characteristic of the invention, that voltage limiter is preceded by a switch enabling the output of said rectifier to be short-circuited, a decoupling diode being provided between said switch and said voltage limiter.

According to another characteristic of the invention, the system comprises at least two transformers connected in series for powering respectively firstly DC auxiliary equipment, and secondly AC auxiliary equipment.

According to another aspect of the invention, there is also provided a power supply generator for the above-defined system for powering auxiliary equipment, wherein the system comprises rest power supply means for maintaining a minimum power supply current when the pumping station is stopped.

This makes it possible to maintain a rest current which is insufficient for driving the motor and pump unit, but which serves to keep the auxiliary equipment under power.

This current can also serve to maintain the temperature of the pump motor by means of the power it delivers thereto.

According to another characteristic of the invention, there is provided means that increase the rest power supply current to deliver higher current temporarily during spaced-apart periods, while the pumping station is at rest.

This increased current provides excess energy to the pump, but for a short period only so the pump can accommodate it, its rise in temperature remaining within set limits. The power supply frequency is then such that the motor and pump unit remains stationary. The increased current serves to obtain the voltage required for powering the AC auxiliary equipment.

BRIEF DESCRIPTION OF THE DRAWINGS

The various objects and characteristics of the invention appear more clearly from the following description of an embodiment of the invention given by way of non-limiting example and with reference to the accompanying figures, in which.

DETAILED DESCRIPTION OF THE PREFERRED EMBODIMENTS

Figure 1:
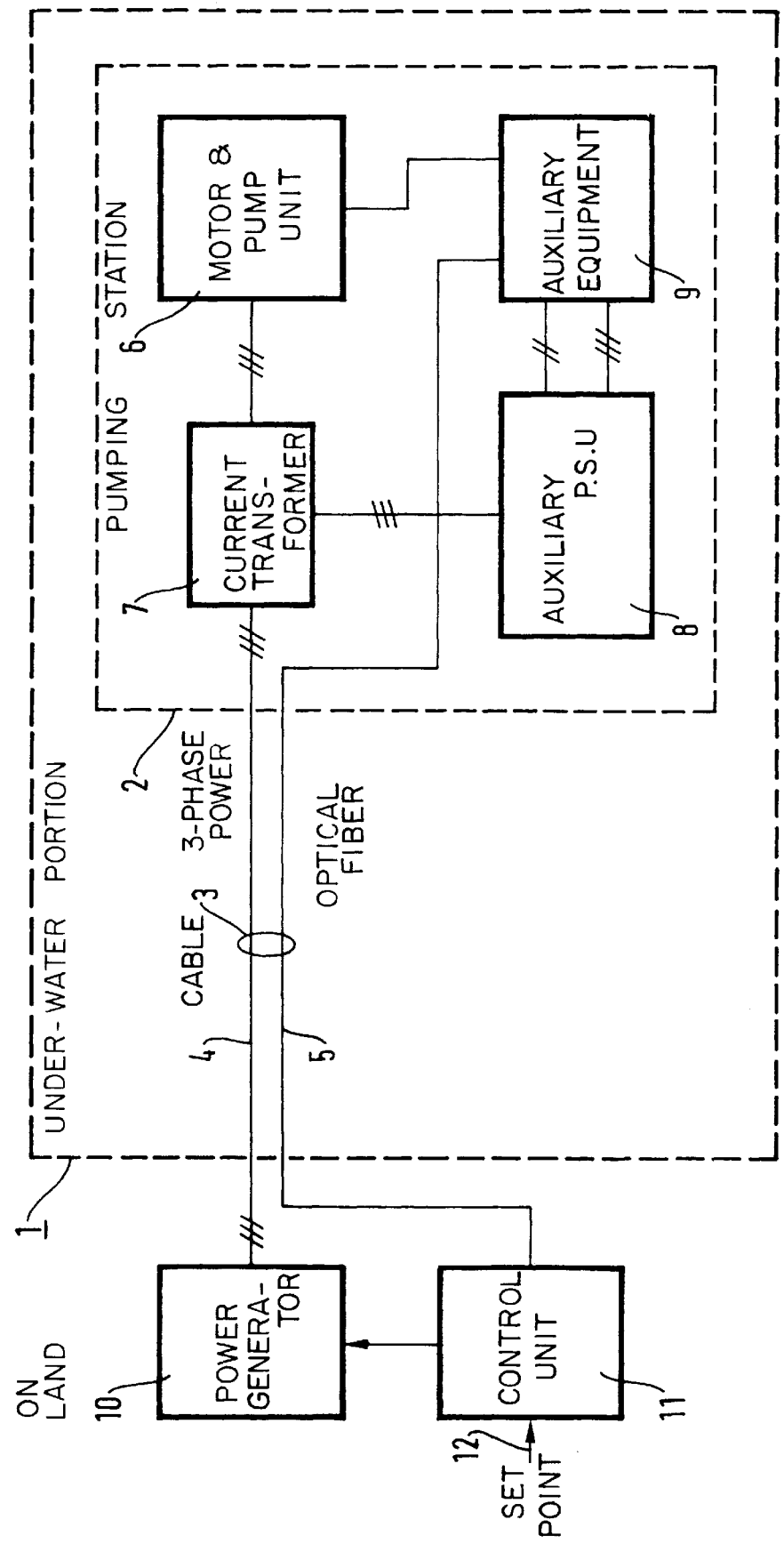
FIG. 1 is a block diagram of a power supply and control system for a remotely-powered pumping station, using the system of the invention for powering auxiliary equipment.
Figure 2:
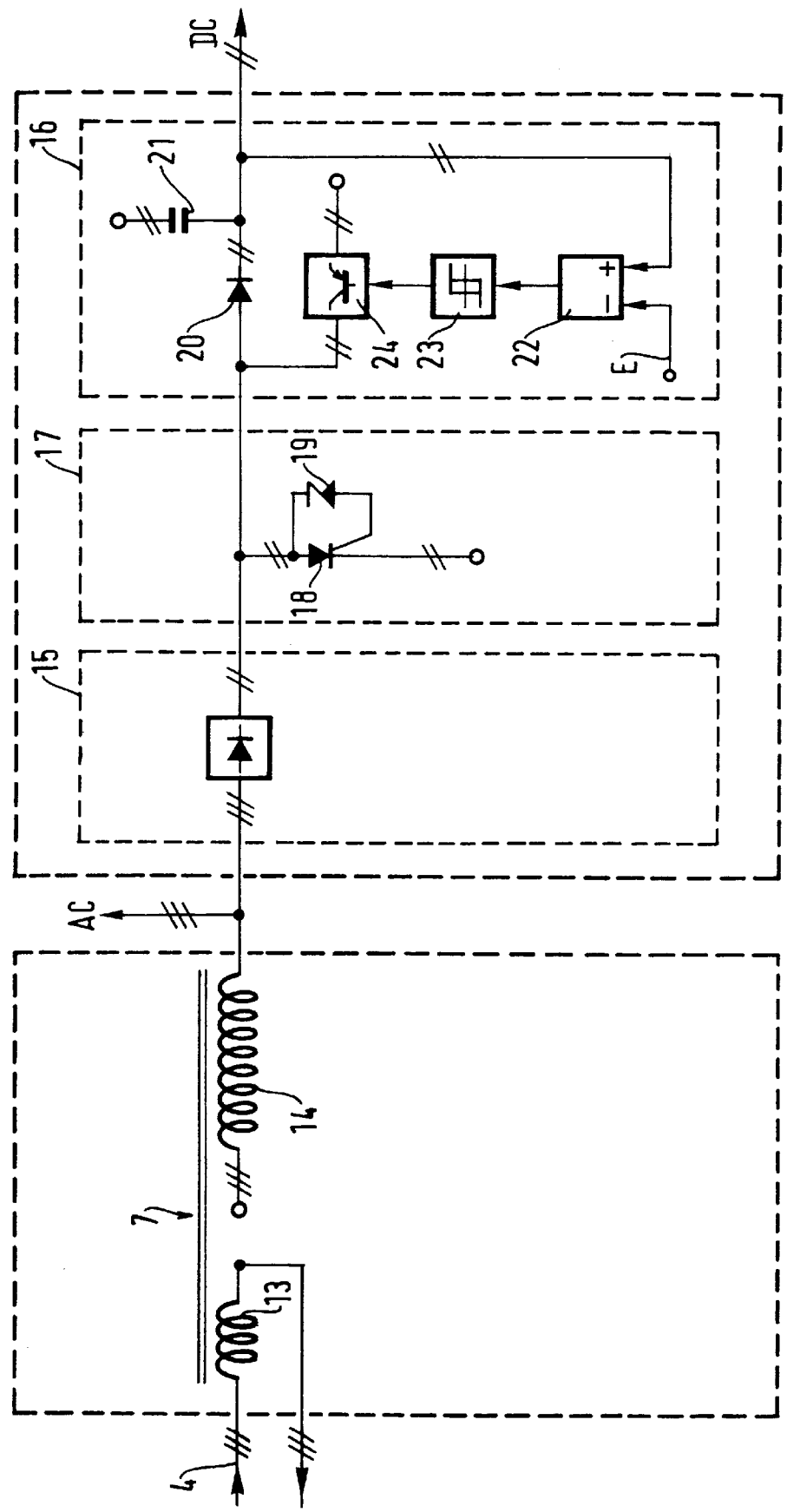
FIG. 2 is a more detailed diagram of an embodiment of the system of the invention for powering auxiliary equipment and designed to feed DC to the auxiliary equipment.
Figure 3:
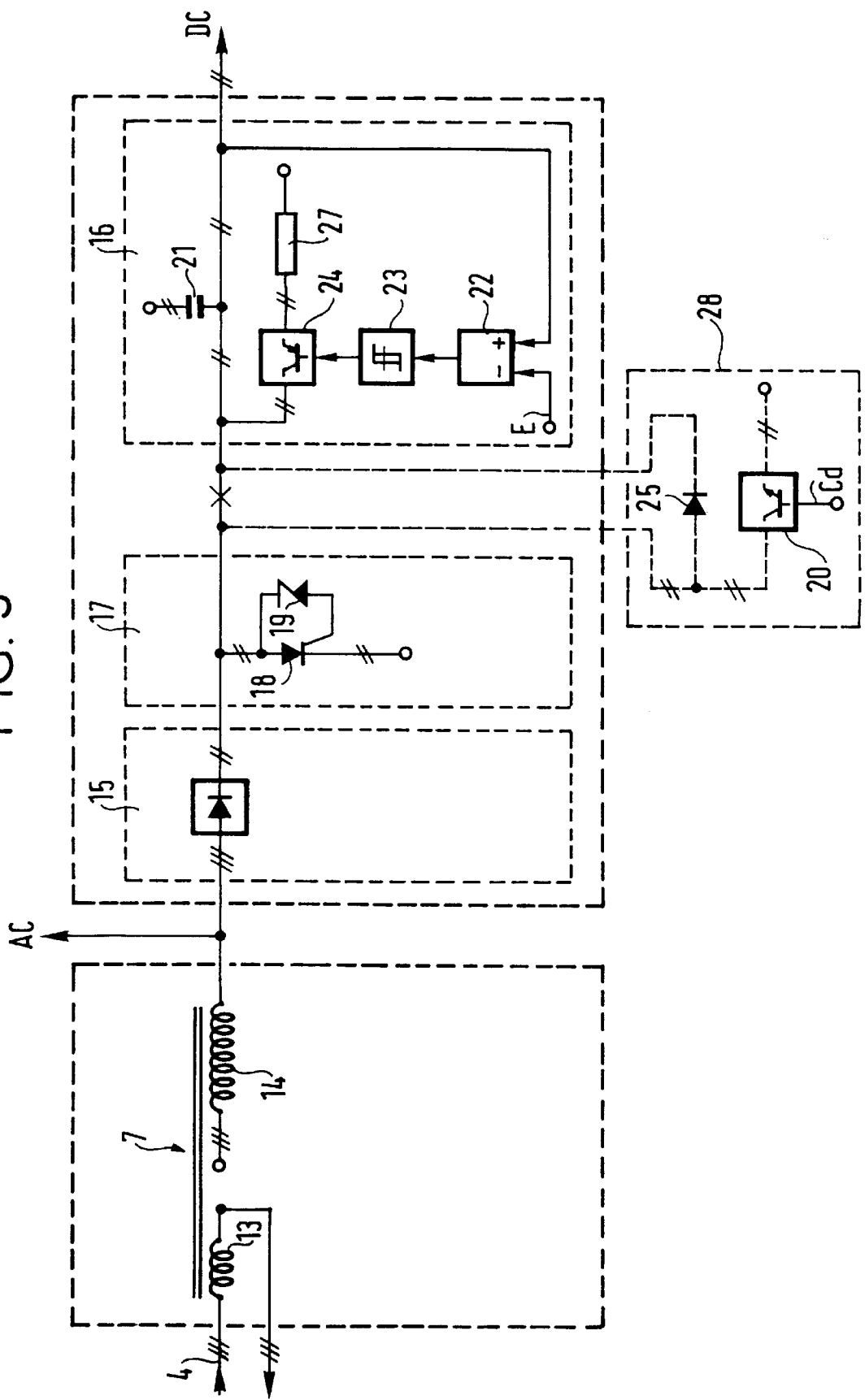
FIG. 3 is a more detailed diagram of an embodiment of the system of the invention for powering auxiliary equipment and designed to feed AC to the auxiliary equipment.

FIG. 1 shows the underwater portion 1 of a power supply control system for a pumping station 2, connected to a cable 3 having a three-phase power line 4 and an optical fiber 5. Before it reaches a motor and pump unit 6, the power supply line 3 has a current transformer 7 inserted therein which extracts current from the line for powering an auxiliary equipment power supply unit 8, embodiments of which are shown in FIGS. 2 and 3, which power supply unit powers auxiliary equipment 9 coupled to the motor and pump unit 6. A plurality of transformers 7 may optionally be connected in series in the power line, each being associated with a respective power supply unit 8, for the purpose of powering different items of auxiliary equipment, as explained below.

On land, the power supply generator for the pumping station 10 delivers power to the line 3 at a current and a frequency that are suitable for causing the motor and pump unit 6 to run at the desired rate. The power supply generator 10 is controlled by a control and monitoring unit 11 which itself receives running instructions 12. The unit 11 communicates by means of the optical fiber 5 with the auxiliary equipment 9.

In particular, the control and monitoring unit 10 receives information about the running conditions of the motor and pump unit 6, thereby enabling the motor and pump unit to be run under loop control.

The advantage of such a system for powering and for controlling the pumping station is that it comprises only one subsea power cable having three conductors and one (or more) optical fibers, which is relatively cheap, particularly since such cables are available on the market for other applications.

The use of a current transformer inserted in series with the power line adds a load in series, however the load is limited, as explained below, and when the voltage delivered to the motor and pump unit is controlled by means of a control loop it is taken into account automatically. There is therefore no penalty concerning loss of power delivered to the motor and pump unit.

A first embodiment of the invention, is described in greater detail with reference to FIG. 2 which shows a system for powering auxiliary equipment, which system comprises the current transformer 7 and the auxiliary power supply unit 8 of FIG. 1, and is suitable for feeding DC to the auxiliary equipment.

The three-phase power line passes therethrough prior to reaching the motor and pump unit 6 (FIG. 1) via a primary winding 13 (one for each phase) of a current transformer 7. A secondary winding 14 (one per phase) of the current transformer is connected a bridge rectifier 15 coupled to a voltage limiter 16 via a two-wire line, for providing a DC output to which DC powered auxiliary equipment is connected, i.e. equipment that is powered by a direct voltage of defined value and that collectively consumes an amount of direct current that the power supply system is capable of delivering.

Connected between the bridge rectifier 15 and the limiter 16 is a surge protection circuit 17 which comprises essentially a controlled rectifier 18 controlled by means of a zener diode 19 and feeding a short circuit. The output voltage from the bridge rectifier is thus limited by triggering this protection circuit in the event of an abnormal surge as may be caused, for example, by a failure of the motor and pump unit. Once the controlled rectifier 18 has been caused to conduct, the voltage delivered to the voltage limiter drops to zero. Thereafter, to reestablish the supply of voltage to the voltage limiter it is necessary to interrupt current feed to the cable in order to cause the controlled rectifier to switch off.

The voltage limiter 16 comprises a rectifier 20 charging a capacitor 21. The voltage by which the capacitor is charged is a regulated voltage that delivers the regulated DC power supply; it is delivered to a voltage comparator 22 which also receives a reference voltage E and which takes the difference between them. The difference between these voltages controls a switch 24 via a hysteresis circuit 23. When the DC voltage exceeds the reference voltage E by a value determined by the hysteresis circuit 23, the switch 24 diverts the current delivered by the rectifier 15 to a short circuit. The diode 20 ceases to conduct. The capacitor 21 continues to power the auxiliary equipment, but discharges and the DC voltage decreases. When it reaches the lower threshold of the hysteresis circuit 23, the switch 24 opens again, the capacitor recharges, and so on.

As a result, so long as the power line supplies sufficient current, i.e. even when the motor and pump unit is at rest, as explained below, the voltage limiter 16 operates, and limits the voltage delivered to the DC output. The voltage seen through the rectifier 15 and the transformer 7 is the voltage which loads the power circuit and which must be provided by the generator 10. It is very small: a few volts, and that remains the case whatever the running conditions of the motor and pump unit.

More precisely, when not pumping, the generator 10 provides a minimum power supply current, e.g. 30 A, with the voltage being about 60 V, at the pumping station. Under such conditions, the voltage at the output terminals of the rectifier bridge is, for example, 50 V, with the limiter circuit delivering about 200 W, at a voltage that oscillates around the voltage E, within the hysteresis limits of the circuit 23. The protection circuit is not in operation.

While pumping, the regulated DC power supply is provided under the conditions described above. The limit switch 24 must conduct all of the current delivered by the rectifier 15, minus the current consumed by the auxiliary equipment, but under short circuit conditions so that the power dissipated is minimal.

When the limiter 16, and mainly the switch 24, runs the risk of being overloaded, the protection circuit intervenes, with its thyristor 18 being capable of withstanding much higher currents.

An advantage of this circuit is thus that it can operate with currents on the cable varying over a wide range, since the DC power supply voltage is limited by a short circuit, i.e. without dissipating energy.

Reference is now made to FIG. 3 which shows another embodiment of the invention, this time suitable for powering auxiliary equipment with AC.

In this example, the structure is generally similar to that of the unit shown in FIG. 2, and all components that are functionally identical are given the same references as in FIG. 2. It can thus be seen that the transformer 7, the rectifier 15, the protection module 17, and the voltage limiter 16 are unchanged except that the diode 20 is absent from the voltage limiter 16, and a resistive load 27 is added in series with the limiting switch 24. Also, when the direct link between the modules 16 and 17 is broken, an optional module 28 is provided comprising a series diode 25 and an interrupter switch 26 receiving a control signal Cd, suitable for diverting the DC output current from the rectifier 15 to a short circuit.

The AC auxiliary equipment to be powered is connected to the AC output which is the three-phase output of the winding 14.

The transformer 7, the rectifier 15, the protection circuit 15, and the limiter 16 operate as described with reference to FIG. 2, with appropriate dimensioning as will readily be understood by the person skilled in the art, and with the exception of the explanation given below.

As a result, when the charge on the capacitor 21 does not reach the reference voltage E, the voltage limiter does not act and the AC voltage is that delivered by the winding 14. When the charge on the capacitor 21 exceeds the reference voltage E by the hysteresis threshold of the circuit 23, the limiting switch 24 becomes conductive, but the diverted current is now applied to the resistive load 27. The effect is that the voltage ceases to increase across the terminals of the capacitor, at the output of the rectifier, and at the output of the winding 14. This regulates the three-phase AC voltage delivered on the AC output. It will be understood that under such circumstances, the diode 20 of FIG. 2 is not necessary.

Compared with the embodiment of FIG. 2, it can easily be seen that the embodiment of FIG. 3, while offering the same effects of limiting the series voltage drop on the power line and of regulating the voltage delivered to the auxiliary equipment, now imposes power dissipation in the limiting switch 24 and its resistive load 27.

This is not a disadvantage, for the following reason: the auxiliary equipment in question, fans or the pump of an oil pressure accumulator (for greasing the motor and pump unit) do not need to operate continuously when the power supply system is at rest with the motor and pump unit stopped. Intermittent operation suffices.

To satisfy this need, provision is thus made for the generator 10 to deliver periodically (e.g. for 5 minutes every 10 minutes) a current of 130 A instead of 30 A, with the frequency being and remaining relatively high, so that the motor and pump unit remains stopped. Temperature rises, but the duration of the period and the duty ratio are such as to remain acceptable.

The reference voltage E is then selected so that regulation takes place a little below said current value, at the voltage which is the result of a current of 120 A, for example, such that given the transformer ratio, the three-phase voltage at the output from the secondary winding 14, i.e. at the AC output, is about 400 V.

In this way, the current to be diverted by the voltage limiter, and in particular by the limiting switch, during periods when it reaches its maximum (the above-mentioned 300 A) are much shorter than periods during which the voltage limiter of FIG. 2 needs to divert current. The power dissipated in the switch 24 and the resistive load 27 is thus limited, thus making this solution economically viable.

There remains to be considered the case where the optional module 28 is provided. It comprises essentially an interrupter switch 26 which, under the effect of the control signal Cd (which may be supplied by part of the DC-powered auxiliary equipment, for example) short-circuits the DC output of the rectifier 15. The AC delivered to the AC output is then practically zero. The AC auxiliary equipment is no longer powered. Like the diode 20 (in FIG. 2), the diode 25 protects the capacitor 21 and, in this case, serves more particularly to avoid it being short-circuited. As soon as the control signal Cd is removed, the interrupter switch turns off again and the three-phase AC voltage is reestablished at its previous value on the AC output. Thus, this additional module is installed whenever it is necessary to be able to stop operation of AC auxiliary equipment during a period in which it is being supplied with power enabling it to operate.

Still in accordance with the invention, in a pumping installation that includes both DC auxiliary equipment and AC auxiliary equipment, a transformer 7 is provided associated with a unit as shown in FIG. 2 for the DC equipment and, in series therewith, a second transformer 7 is provided together with a unit as shown in FIG. 3 for the AC equipment. If it is necessary to provide a plurality of DC power supply outputs, then a plurality of circuits as shown in FIG. 2 are provided, with their transformers 7 likewise connected in series. The same would apply for a plurality of AC outputs.

Finally, it will be observed that the DC output of the FIG. 3 power supply unit can also supply DC at about 500 V, while simultaneously supplying the AC voltage, if only to provide a very simple way of monitoring that the AC voltage is present.

The description above is given purely by way of non-limiting example and the numerical values, in particular, can differ from those of the embodiment considered.

What is claimed is:

1. A system for supplying power to auxiliary equipment in a remotely-powered pumping station including a pumping motor, the system comprising:
   a three-phase power line;
   a first transformer having a primary winding connected in series between the three-phase power line and the pumping motor;
   a rectifier connected to a secondary winding of said first transformer for supplying direct current (DC) power to the auxiliary equipment; and
   a voltage limiting circuit connected to an output of said rectifier for diverting a DC output current supplied by said rectifier, wherein said voltage limiting circuit comprises a capacitor which is connected to and charged by a DC output voltage of said rectifier, a voltage comparator for comparing a charged voltage of said capacitor with a reference voltage, and a voltage-limiting switch which diverts the DC output current supplied by said rectifier to a short circuit in accordance with a comparison result of said voltage comparator, wherein said capacitor discharges to supply power to the auxiliary equipment when said voltage-limiting switch diverts said DC output current from said rectifier.

2. A system for powering auxiliary equipment at a pumping station according to claim 1, wherein said auxiliary equipment comprises DC powered equipment connected to the output of said rectifier in parallel with said voltage limiting circuit.

3. A system for powering auxiliary equipment at a pumping station according to claim 2, further comprising a diode connected between said voltage-limiting switch and said capacitor, in order to preserve the charge on said capacitor when said voltage-limiting switch diverts the DC output current supplied by said rectifier.

4. A system for powering auxiliary equipment at a pumping station according to claim 2, further comprising a power supply generator for supplying three-phase AC power to said first transformer through said three-phase power line, said power supply generator comprising means for supplying a minimum power supply current when the pumping station is stopped.

5. A system for powering auxiliary equipment at a pumping station according to claim 4, wherein said power supply generator further comprises means for temporarily increasing the minimum power supply current to intermittently supply higher current for a predetermined time period, while the pumping station is stopped.

6. A system for powering auxiliary equipment at a pumping station according to claim 1, wherein said auxiliary equipment further comprises AC powered equipment connected to said secondary winding of said transformer in parallel with said rectifier.

7. A system for powering auxiliary equipment at a pumping station according to claim 1, wherein said voltage-limiting switch diverts the DC output current supplied by said rectifier into a resistive load.

8. A system for powering auxiliary equipment at a pumping station according to claim 7, further comprising:

an interrupter switch connected to the output of said rectifier, said interrupter diverting the DC output current of said rectifier to a short circuit; and a diode connected between said interrupter switch and said voltage limiting circuit.

9. A system for powering auxiliary equipment at a pumping station according to claim 7, further comprising a surge protection circuit connected to the output of said rectifier for diverting the DC output current supplied by said rectifier to a short circuit if the DC output voltage exceeds a predetermined level.

10. A system for powering auxiliary equipment at a pumping station according to claim 1, further comprising a second transformer connected in series with said first transformer for supplying power to AC powered auxiliary equipment.

11. A system for powering auxiliary equipment at a pumping station according to claim 1, further comprising a surge protection circuit connected to the output of said rectifier for diverting the DC output current supplied by said rectifier to a short circuit if the DC output voltage exceeds a predetermined level.

* * * * *